United States Patent
Okayama

(10) Patent No.: US 10,306,084 B2
(45) Date of Patent: May 28, 2019

(54) COMMUNICATION APPARATUS ACQUIRING SETTING INFORMATION ASSOCIATED WITH USER

(71) Applicant: CANON KABUSHIKI KAISHA, Tokyo (JP)

(72) Inventor: Noritsugu Okayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 15/473,314

(22) Filed: Mar. 29, 2017

(65) Prior Publication Data
US 2017/0289369 A1    Oct. 5, 2017

(30) Foreign Application Priority Data
Mar. 31, 2016   (JP) .................. 2016-072591

(51) Int. Cl.
*G06F 3/12*     (2006.01)
*H04N 1/00*   (2006.01)

(52) U.S. Cl.
CPC ....... *H04N 1/00411* (2013.01); *G06F 3/1204* (2013.01); *G06F 3/1222* (2013.01); *G06F 3/1238* (2013.01); *G06F 3/1255* (2013.01); *G06F 3/1288* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0128844 A1* | 5/2009 | Kondo | ............... | H04N 1/00244 358/1.15 |
| 2015/0153969 A1* | 6/2015 | Okayama | ............... | G06F 3/1204 358/1.15 |
| 2015/0189116 A1* | 7/2015 | Ito | ............... | H04N 1/00973 358/1.13 |
| 2015/0373216 A1* | 12/2015 | Maeda | ............... | H04N 1/4406 358/1.14 |
| 2016/0014285 A1* | 1/2016 | Nakahara | ............... | H04N 1/00928 358/1.13 |

FOREIGN PATENT DOCUMENTS

JP           2016-010005 A     1/2016

* cited by examiner

*Primary Examiner* — Paul F Payer
(74) *Attorney, Agent, or Firm* — Canon U.S.A., Inc. IP Division

(57) ABSTRACT

A display unit displays a predetermined message, if at least part of setting information received from a server after a login is not reflected or is possibly not to be reflected in an information processing apparatus.

11 Claims, 11 Drawing Sheets

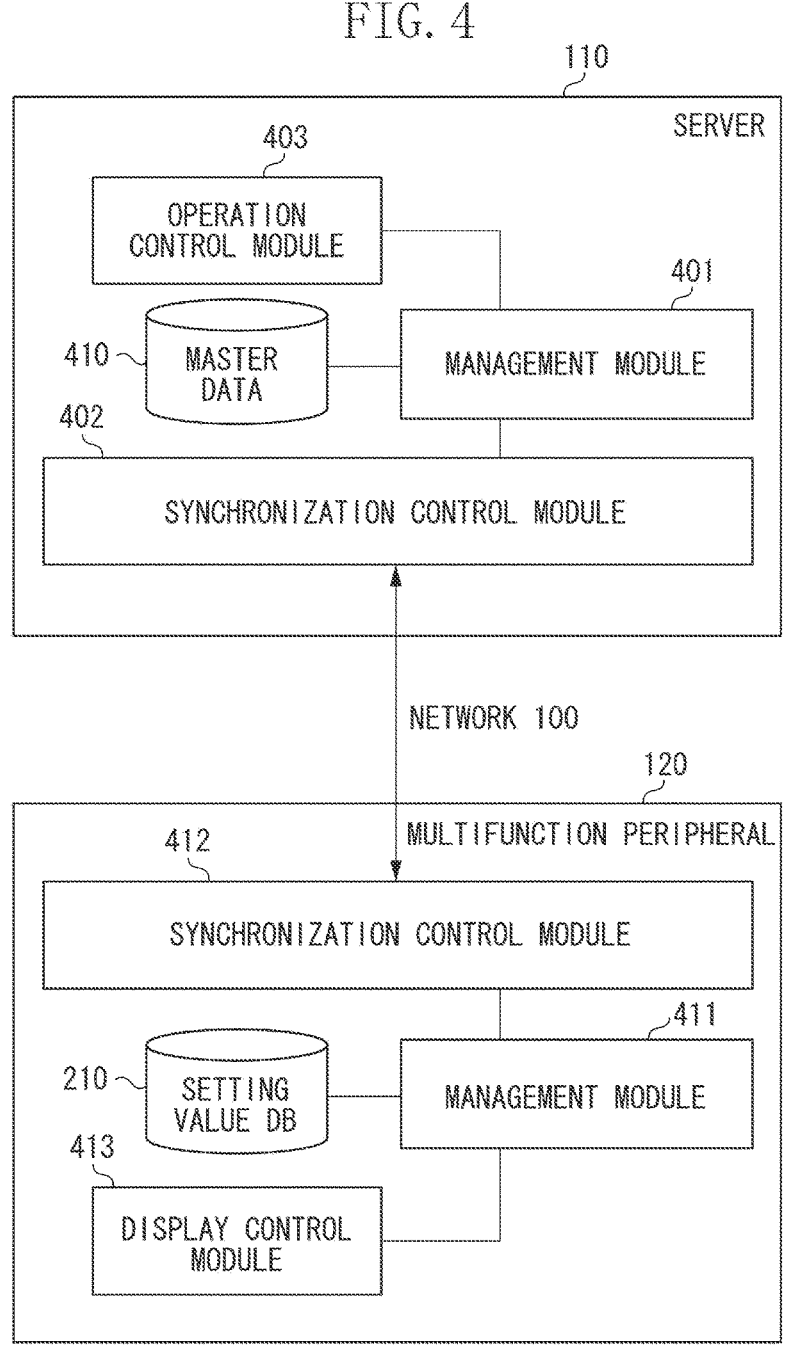

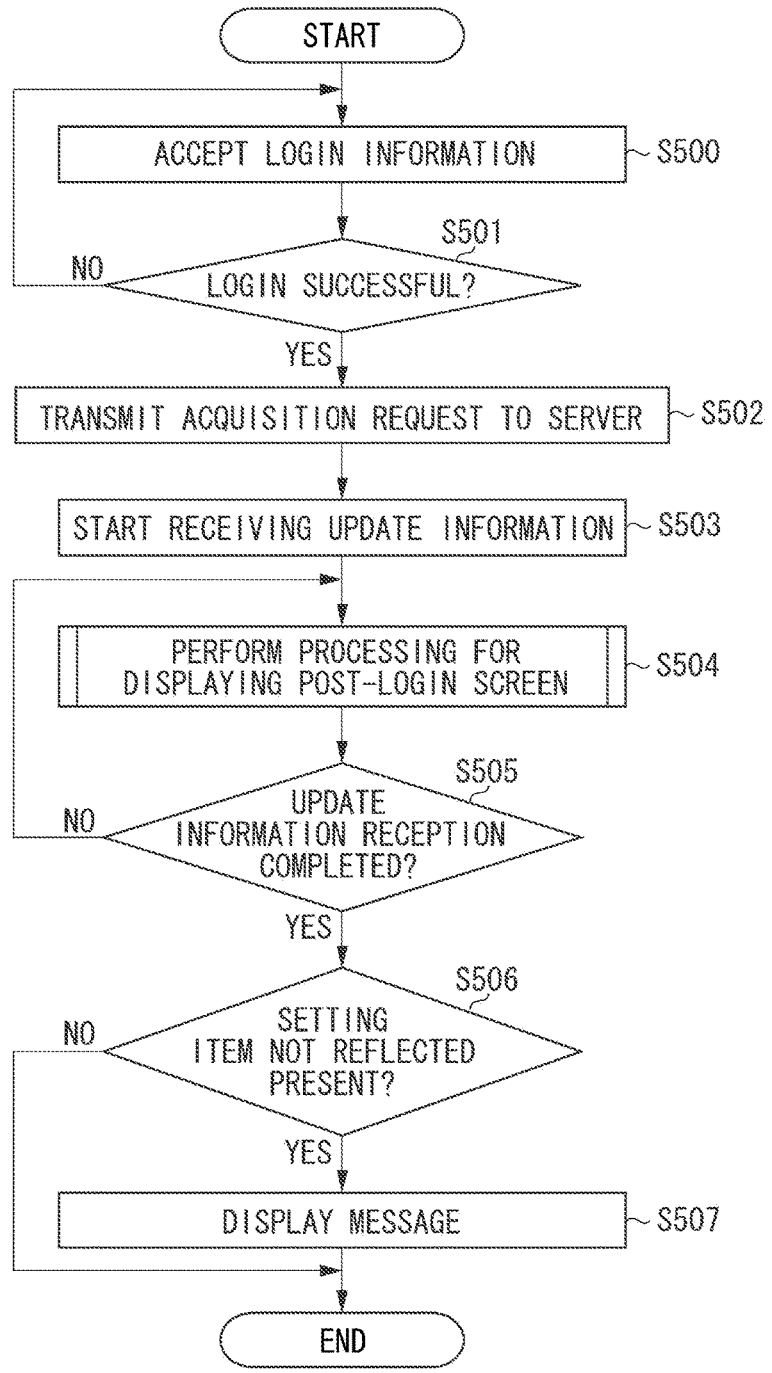

FIG. 6A

```
ENTER USER NAME AND PASSWORD, AND PRESS LOGIN

[ USER NAME ]
          [ PASSWORD  ]

[   LOGIN   ]

[   CANCEL  ]
```

FIG. 6B

```
MAIN MENU

[ COPY ]  [ SCAN ]  [ REGISTER
                         SETTING ]

[ USE SCANNED ]  [ FAX ]
   [    FILE     ]

USER DATA IS SYNCHRONIZED.
LOG IN AGAIN TO ACTIVATE SETTING.

[ LOGOUT ]
```

FIG. 7A

| SETTING ITEM ID | SETTING ITEM NAME | REFLECT AT LOGIN |
|---|---|---|
| personal_settings.language | LANGUAGE SETTING | NO |
| personal_settings.copy_settings | COPY SETTINGS | NO |
| personal_settings.address_book | ADDRESS BOOK | YES |

FIG. 7B

| SETTING ITEM ID | SETTING ITEM NAME | REFLECT AT LOGIN | ASSOCIATED DATA | ESTIMATED TIME |
|---|---|---|---|---|
| personal_settings.language | LANGUAGE SETTING | NO | NONE | +2 SECOND |
| personal_settings.copy_settings | COPY SETTINGS | RECEIVED UPDATE INFORMATION IS REFLECTED ONLY WHEN REFLECTION CAN BE PERFORMED WITHIN PREDETERMINED TIME, IF RECEIVED UPDATE INFORMATION INCLUDES PREDETERMINED ASSOCIATED DATA | common_settings. default_mode=COPY | +1 SECOND |
| personal_settings.address_book | ADDRESS BOOK | YES | NONE | |

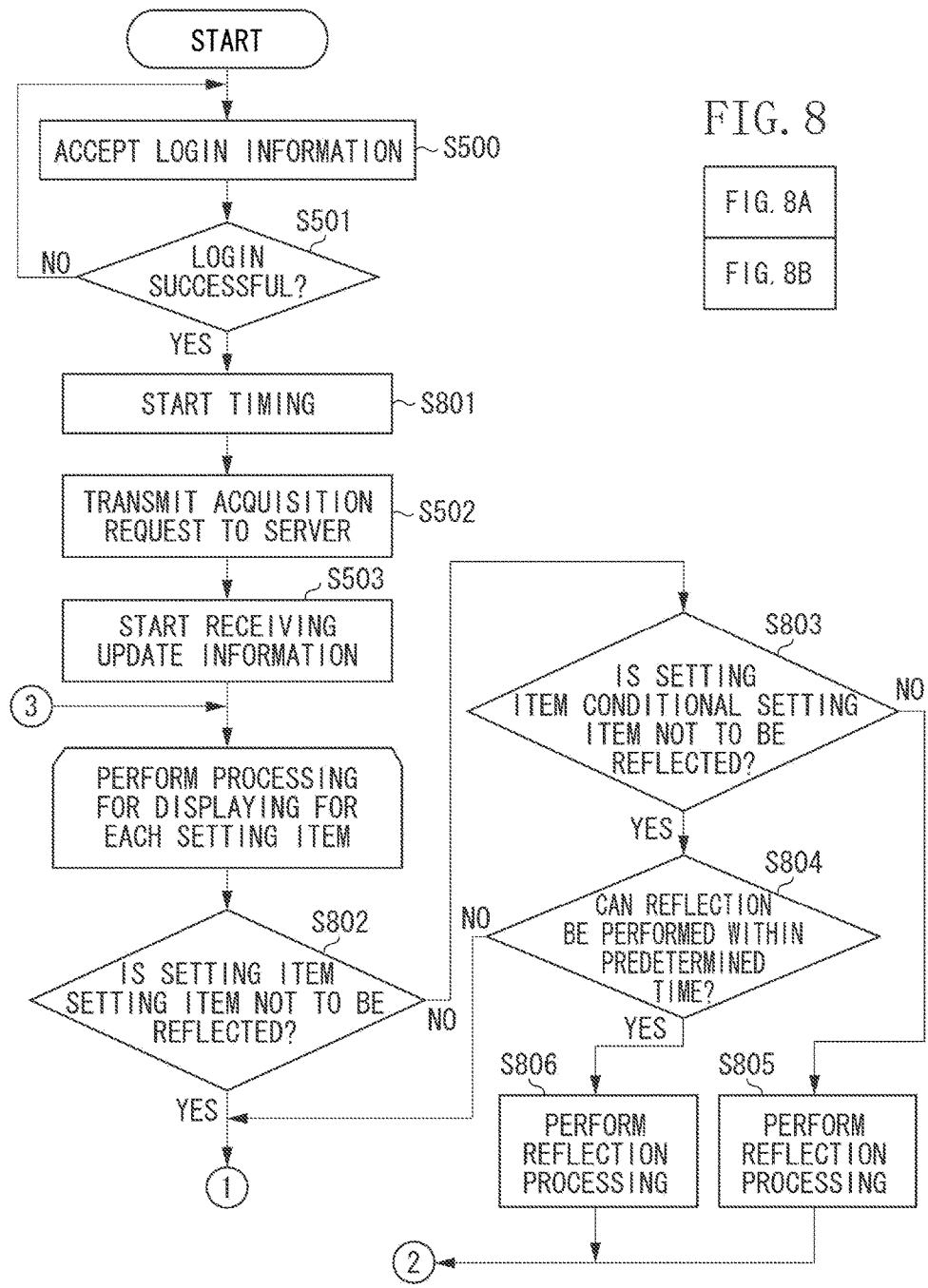

COMMUNICATION APPARATUS ACQUIRING SETTING INFORMATION ASSOCIATED WITH USER

BACKGROUND OF THE INVENTION

Field of the Invention

The present invention relates to a technique for restraining processing for allowing setting information about a predetermined setting item, among setting information received from a server in response to execution of login processing in an information processing apparatus, to be reflected in settings of the information processing apparatus.

Description of the Related Art

Japanese Patent Application Laid-Open No. 2016-10005 discusses an image forming apparatus that acquires setting information of a user from a server when the user logs into the image forming apparatus. The setting information of the user includes, for example, a language setting for a language to be displayed in a display unit of the image forming apparatus, and a layout setting for a screen to be displayed in the display unit after a login.

Japanese Patent Application Laid-Open No. 2016-10005 discusses a login system. In this login system, if acquisition of setting information of a user is completed after a lapse of a predetermined time from a login, the image forming apparatus operates using setting information acquired from a server. On the other hand, if the acquisition of the setting information of the user is not completed after a lapse of the predetermined time from the login, the image forming apparatus operates using setting information saved in the image forming apparatus before the login.

In the login system discussed in Japanese Patent Application Laid-Open No. 2016-10005, the setting information transmitted from the server is reflected in settings of the image forming apparatus in some cases and is not be reflected in other cases, depending on the receiving state of the setting information in the image forming apparatus.

When the setting information transmitted from the server is reflected in the settings of the image forming apparatus in some cases and is not be reflected in other cases, the user is not sure whether the setting information received from the server is reflected in the image forming apparatus in each case. In addition, when the setting information is not reflected in the settings of the image forming apparatus, the user is not sure what kind of processing is necessary for reflecting the setting information in the image forming apparatus.

SUMMARY OF THE INVENTION

According to an aspect of the present invention, an information processing apparatus includes a memory device that stores a set of instructions, and at least one processor that executes the instructions to accept a login request of a user, receive update information indicating update contents of setting information stored in a server from the server, if login processing of the user is executed in response to the login request, and cause a display unit to display a predetermined message, if at least part of the received update information is not reflected in settings of the information processing apparatus, or if there is a possibility of not reflecting at least part of the received update information in the settings of the information processing apparatus.

Further features of the present invention will become apparent from the following description of exemplary embodiments with reference to the attached drawings.

BRIEF DESCRIPTION OF THE DRAWINGS

FIG. 4 is a diagram illustrating a software module configuration of each of the server and the multifunction peripheral.

FIGS. 5A and 5B are diagrams illustrating operation of the multifunction peripheral, according to a first exemplary embodiment.

FIG. 6A is a diagram illustrating an example of a login screen.

FIG. 6B is a diagram illustrating an example of a post-login screen.

FIG. 7A is a diagram illustrating a correspondence between a setting item and whether to execute reflection processing.

FIG. 7B is a diagram illustrating a correspondence between a setting item and an estimated time for the reflection processing.

DESCRIPTION OF THE EMBODIMENTS

Exemplary embodiments of the present invention will be described below with reference to the drawings.

Figure 1:
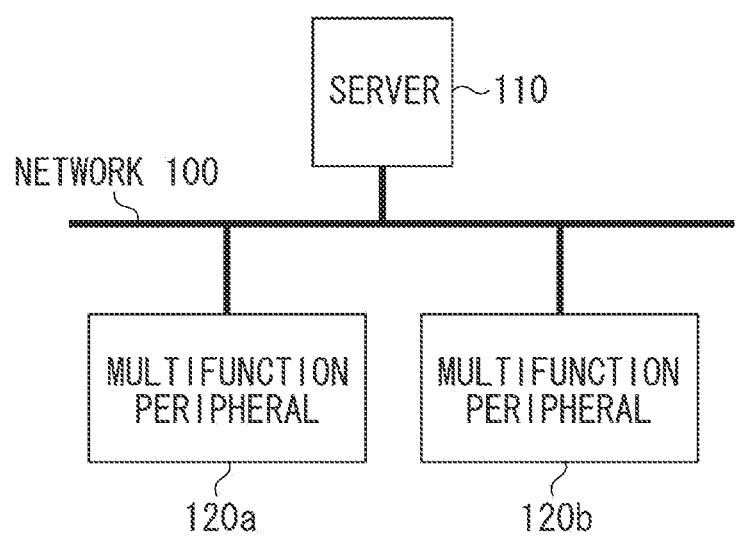
FIG. 1 is a diagram illustrating a system configuration.

FIG. 1 illustrates a block diagram of an information processing system according to a first exemplary embodiment. In the example illustrated in FIG. 1, a server 110, a multifunction peripheral 120a, and a multifunction peripheral 120b are connected via a network 100. Thereinafter, the multifunction peripheral 120a and the multifunction peripheral 120b may be collectively referred to as a multifunction peripheral 120.

The server 110 manages master data 410. The server 110 acquires update information indicating update contents of setting information of the multifunction peripheral 120, from the multifunction peripheral 120. Upon acquiring the update information from the multifunction peripheral 120, the server 110 updates the master data 410, based on the acquired update information.

Further, in response to an acquisition request received from the multifunction peripheral 120, the server 110 transmits update information indicating update contents of the master data 410, to the multifunction peripheral 120. In the present exemplary embodiment, the server 110 receives the acquisition request from the multifunction peripheral 120, when a user logs into the multifunction peripheral 120. The server 110 also receives the acquisition request periodically transmitted by the multifunction peripheral 120.

The server 110 manages setting information of a plurality of image forming apparatuses. The server 110 may be configured, for example, as an image forming apparatus.

In the present exemplary embodiment, the multifunction peripheral 120 is an information processing apparatus. In particular, the multifunction peripheral 120 is an image forming apparatus that implements one or more kinds of function (such as a copy function, a facsimile function, and a scanning function). In place of the multifunction peripheral 120, an image forming apparatus having a single function may be employed. In other words, an image forming apparatus having only a copy function, a facsimile function, or a scanning function may be employed.

The multifunction peripheral 120 operates as a client for the server 110. The multifunction peripheral 120 manages setting information (hereinafter may be referred to as "setting value") to be used by the multifunction peripheral 120 itself for execution of processing. When a setting value is updated by user operation, the multifunction peripheral 120 transmits update information indicating update contents of the setting value of the multifunction peripheral 120, to the server 110.

In addition, the multifunction peripheral 120 transmits an acquisition request to acquire update information of the master data 410, to the server 110. In the present exemplary embodiment, the multifunction peripheral 120 periodically transmits the acquisition request to the server 110.

The multifunction peripheral 120 also transmits an acquisition request to acquire update information about a setting value associated with identification information of a logged-in user to the server 110, when login processing is executed in the multifunction peripheral 120.

The acquisition request transmitted from the multifunction peripheral 120 to the server 110 includes time information indicating the time when update information of the master data 410 is last acquired by the multifunction peripheral 120 from the server 110. The server 110 transmits update information indicating update contents of the master data 410 after the time indicated by the time information included in the acquisition request, to the multifunction peripheral 120 that has transmitted the acquisition request.

With such a configuration, the server 110 and the multifunction peripheral 120 perform synchronization processing for setting values. In the present exemplary embodiment, synchronization is as follows: when one of master data managed by a server and data managed by an image forming apparatus is updated, contents of this update are reflected in the other, so that both have a common value. The present exemplary embodiment will be described taking an example in which transmission of setting information is bidirectionally performed between the server 110 and the multifunction peripheral 120. However, the present exemplary embodiment is also applicable to a system in which setting information is transmitted in only one direction.

Here, in the present exemplary embodiment, reflection is to use a certain setting value as a setting value of the multifunction peripheral 120. When a certain setting value is reflected in the multifunction peripheral 120, the multifunction peripheral 120 operates according to the reflected setting value. Assume that a certain setting value is received by the multifunction peripheral 120 from the server 110, but the received setting value is not reflected. In this case, the multifunction peripheral 120 continues to use a setting value that has been set in the multifunction peripheral 120 before the certain setting value is received.

For example, when a setting value managed by the multifunction peripheral 120a is updated, a setting value in the master data 410 managed by the server 110 is similarly updated. Further, a setting value managed by the multifunction peripheral 120b is similarly updated, according to the update of the setting value in the server 110. In this way, update contents of data are shared between the multifunction peripheral 120a and the multifunction peripheral 120b.

When an update is executed in the multifunction peripheral 120a for user information of a user A, a user expects this update to be reflected in the multifunction peripheral 120b as well. However, in some case, if a setting value is not acquired from the server 110 within a predetermined time after the user A logs into the multifunction peripheral 120b, the multifunction peripheral 120b may not reflect the updated user setting of the user A. In another case, reflection processing takes a long time depending on the setting item of a setting value. In such a case, the multifunction peripheral 120b may not reflect the setting value of a predetermined setting item, by giving priority to a smooth screen transition following a login. For example, assume that a setting value for a screen color of a screen to be displayed after a login is updated in the server 110. Even if the multifunction peripheral 120b is notified of the update contents of the updated setting value, the multifunction peripheral 120b displays a post-login screen with a screen color used before the update, without reflecting the screen color after the update. The multifunction peripheral 120b holds the notified update contents, and reflects the notified update contents, when the user logs into the multifunction peripheral 120b again, or when the user provides an instruction for updating (reloading) of the setting value in a post-login screen.

Therefore, in the present exemplary embodiment, control is performed in such a manner that if all or some of the updated user settings are not be reflected in the multifunction peripheral 120b, the user is notified of a possibility that the user settings after the update may not be reflected in the multifunction peripheral 120b. Details of this control will be described below.

Figure 2:
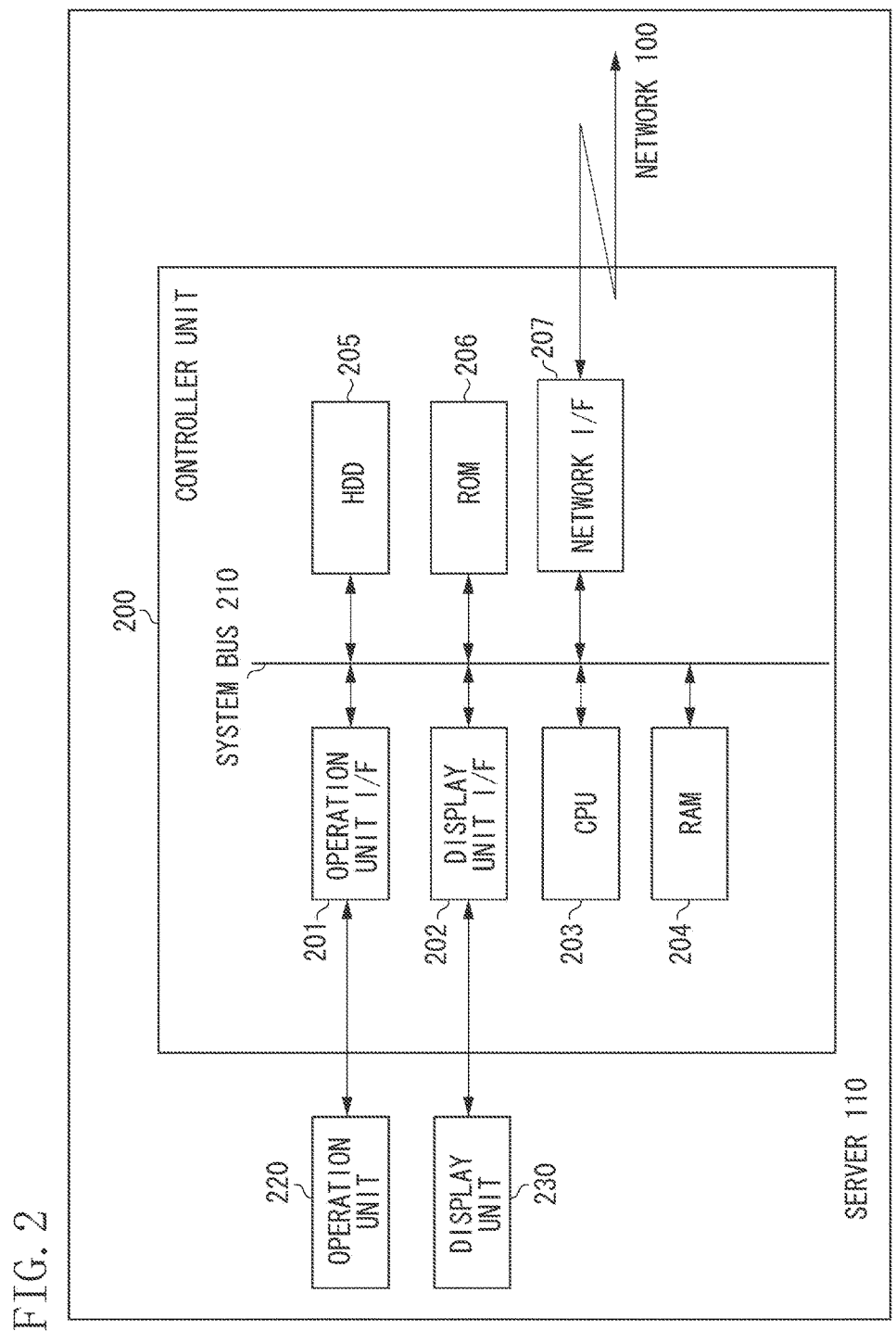
FIG. 2 is a diagram illustrating a configuration of a server.

Next, a configuration of the server 110 will be described with reference to a block diagram in FIG. 2. In the present exemplary embodiment, the server 110 includes a controller unit 200, an operation unit 220, and a display unit 230.

The controller unit 200 has a central processing unit (CPU) 203. The CPU 203 loads a boot program stored in a read only memory (ROM) 206 into a random access memory (RAM) 204, and executes the loaded boot program, thereby starting an operating system (OS). The CPU 203 executes an application program stored in a hard disk drive (HDD) 205 on the OS, thereby executing various kinds of processing. The RAM 204 is used as a work area of the CPU 203.

An operation unit interface (I/F) 201 is an interface with the operation unit 220 including a mouse and a keyboard. The operation unit I/F 201 transmits information to the CPU 203. This information is input by a user via the operation unit 220. A display unit I/F 202 outputs image data to the display unit 230. The image data is to be displayed in the display unit 230 including a display. Each element of the controller unit 200 is connected via a system bus 210.

The display unit 230 may be configured as a unit separate from the server 110. In addition, the operation unit 220 may be configured of a touch panel. In other words, the display unit 230 and the operation unit 220 may be configured in one unit. The HDD 205 stores an application program to be executed by the CPU 203 and the master data 410. A network I/F 207 is connected to the network 100 to input and output information from and to each device on the network 100, via the network 100.

Figure 3:
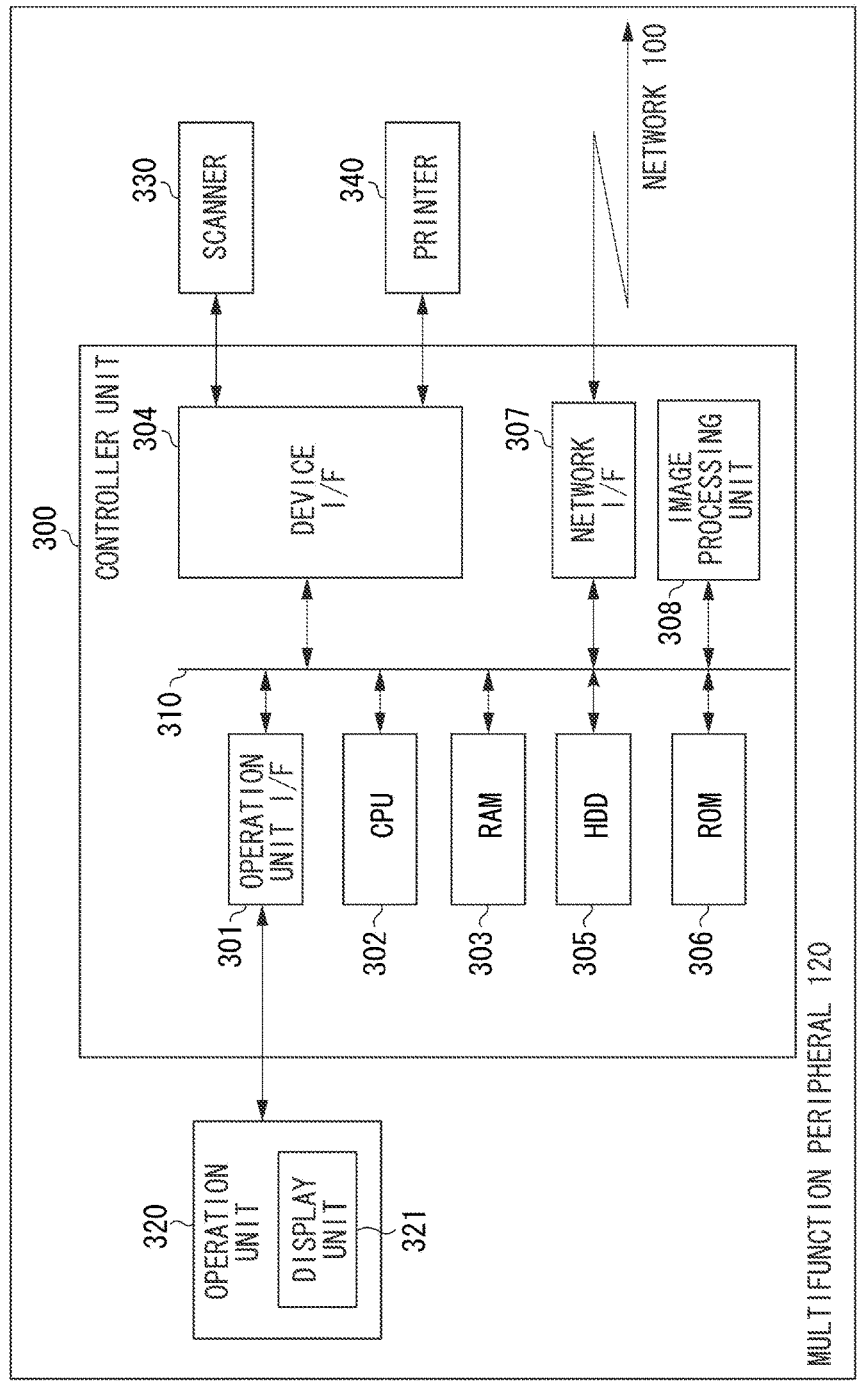
FIG. 3 is a diagram illustrating a configuration of a multifunction peripheral.

Next, a configuration of the multifunction peripheral 120 will be described with reference to a block diagram in FIG. 3. In the present exemplary embodiment, the multifunction peripheral 120 includes a controller unit 300, an operation unit 320, a scanner 330, and a printer 340.

The controller unit 300 has a CPU 302. The CPU 302 loads a boot program stored in a ROM 306 into a RAM 303, and executes the loaded boot program, thereby starting an OS. The CPU 302 executes an application program stored in a HDD 305 on this OS, thereby executing various kinds of processing.

The RAM 303 provides a work area for execution of an application program by the CPU 302. The RAM 303 also provides an image memory area for temporary storage of image data.

An operation unit I/F 301 is an interface with the operation unit 320 having a touch panel. The operation unit I/F 301 outputs image data to the operation unit 320. The image data is to be displayed in the operation unit 320. Further, the operation unit I/F 301 transmits information to the CPU 302. This information is input by a user via the operation unit 320. The operation unit I/F 301 functions as an acceptance unit for accepting a login request input by the user via the operation unit 320.

A device I/F 304 is an interface with the scanner 330 and the printer 340. A network I/F 307 is connected to the network 100 to input and output information from and to each device on the network 100 via the network 100. An image processing unit 308 performs processing. Examples of this processing include processing for an image input from the scanner 330, and processing for an image to be output to the printer 340, and further include image rotation, image compression, resolution conversion, color space conversion, and tone conversion.

Next, a software module configuration in each of the server 110 and the multifunction peripheral 120 will be described with reference to FIG. 4. For example, the ROM 206 or the HDD 205 illustrated in FIG. 2 holds software modules provided in the server 110 illustrated in FIG. 4. The CPU 203 loads the software modules into the RAM 204, and executes the loaded software modules. Further, for example, the ROM 306 or the HDD 305 illustrated in FIG. 3 holds software modules provided in the multifunction peripheral 120 illustrated in FIG. 4. The CPU 302 loads the software modules into the RAM 303, and executes the loaded software modules.

The server 110 has a management module 401, a synchronization control module 402, and an operation control module 403.

The management module 401 performs edit processing including reading, writing, and updating of a setting value in the master data 410. For example, the HDD 205 illustrated in FIG. 2 holds the master data 410. A web application (not illustrated) that can have access to the management module 401 may be provided in the server 110 so that the management module 401 can be operated from a web browser of an external apparatus. Further, contents of a setting value managed by the master data 410 may be viewed from the web browser.

The operation control module 403 causes the management module 401 to execute control for editing the master data 410, according to an operating instruction input from the operation unit 220. For example, assume that an instruction for updating a predetermined setting value stored in the master data 410 is input from the operation unit 220. In this case, the operation control module 403 outputs a command for updating the predetermined setting value to the management module 401. In addition, the operation control module 403 performs control for causing the display unit 230 to display an operation screen. This operation screen is, for example, a graphical user interface to be used by a system administrator to edit a setting value in the master data 410.

The synchronization control module 402 controls execution of the synchronization processing for synchronizing a setting value in a setting value database (DB) 420 managed by the multifunction peripheral 120 and a setting value in the master data 410. For example, the synchronization control module 402 instructs the management module 401 to receive update information of the setting value DB 420 from the multifunction peripheral 120, and to update a setting value in the master data 410 based on the received update information. In addition, the synchronization control module 402 may receive an acquisition request, which requests acquisition of update information about the master data 410, from the multifunction peripheral 120. In this case, the synchronization control module 402 generates update information, based on a setting value read from the master data 410 via the management module 401. The synchronization control module 402 then performs control for outputting the generated update information to the multifunction peripheral 120. This update information is information that indicates update contents updated in the master data 410 after the time when the synchronization processing is last performed with the server 110 by the multifunction peripheral 120 that has issued the acquisition request.

The multifunction peripheral 120 has a management module 411, a synchronization control module 412, and a display control module 413.

The management module 411 performs edit processing including reading, writing, and updating of a setting value in the setting value DB 420. For example, the HDD 305 illustrated in FIG. 3 holds the setting value DB 420. The setting value DB 420 manages setting values to be used by the multifunction peripheral 120 to operate. Examples of the setting values include personal settings for each user of the multifunction peripheral 120, and address book data. The examples of the setting values further include setting values for performing print processing, scan processing, and facsimile processing.

The synchronization control module 412 controls execution of synchronization processing for synchronizing a setting value in the master data 410 managed by the server 110 and a setting value in the setting value DB 420. For example, when a user updates a setting value in the setting value DB 420, the synchronization control module 412 acquires update information indicating update contents of the setting value DB 420 via the management module 411, and transmits the acquired update information to the server 110.

Further, the synchronization control module 412 transmits an acquisition request to the server 110 to acquire update information of the master data 410. This acquisition request is transmitted from the multifunction peripheral 120 to the server 110 at a predetermined interval. The processing of transmitting the acquisition request is polling processing. Furthermore, in the present exemplary embodiment, when a user logs into the multifunction peripheral 120, the synchronization control module 412 transmits an acquisition request to acquire update information of user data associated with the logged-in user to the server 110. In the present exemplary embodiment, the acquisition request to be transmitted includes information for identifying the time when the synchronization processing is last performed with the server 110 by the multifunction peripheral 120 that has issued the acquisition request. Alternatively, information indicating the time of the latest update of the setting value DB 420 may be included.

When receiving the update information of the master data 410 as a response to the acquisition request, the synchronization control module 412 causes the management module 411 to update a setting value in the setting value DB 420 by using the received update information.

The display control module 413 causes the management module 411 to execute control for editing of the setting value DB 420, in response to an operating instruction input from the operation unit 320. For example, when an update instruction for a predetermined setting value stored in the setting value DB 420 is input from the operation unit 320, the display control module 413 outputs a command for causing the management module 411 to update the predetermined setting value. In addition, the display control module 413 performs control for causing a display unit 321 included in the operation unit 320 to display an operation screen. This operation screen is, for example, a graphical user interface for an administrator of the multifunction peripheral 120 to edit a setting value in the setting value DB 420.

Further, the display control module 413 causes the display unit 321 to display a screen for the login processing, by controlling the operation unit I/F 301 and the operation unit 320. The screen for the login processing will be described below with reference to FIGS. 6A to 6C.

Figure 5B:
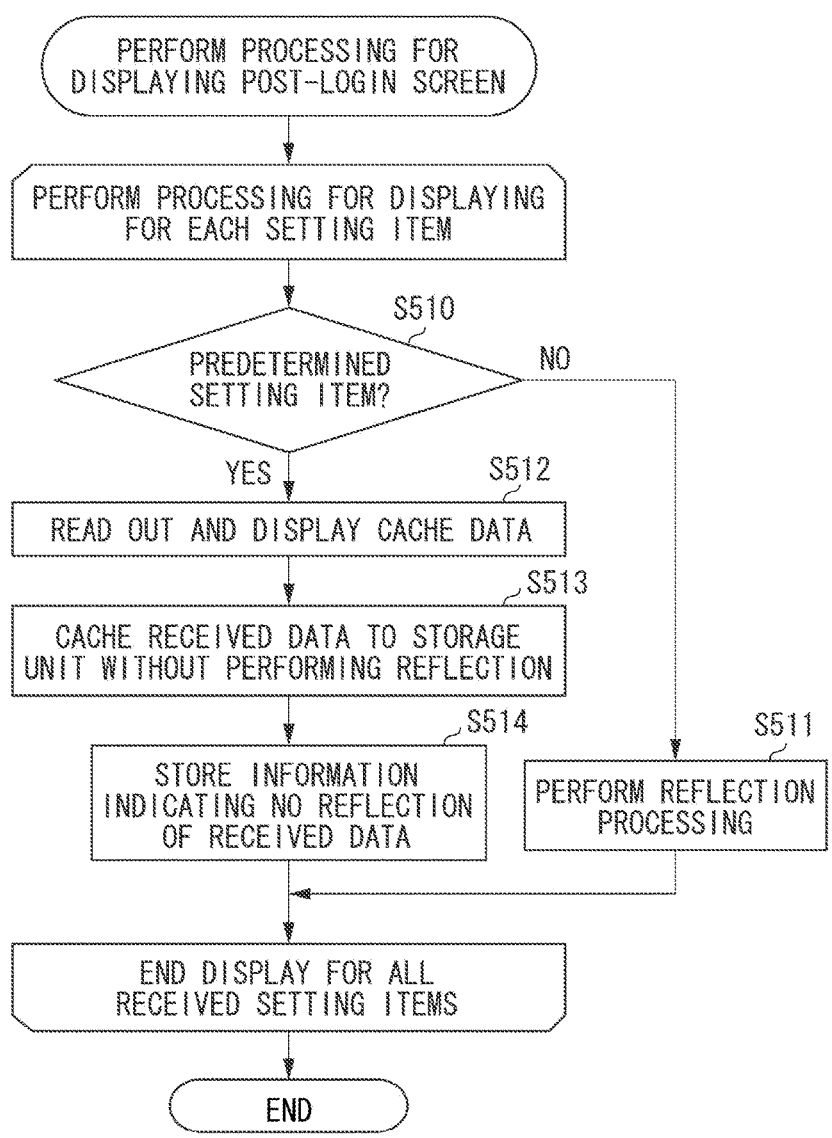

Next, operation of the multifunction peripheral 120 when the login processing is executed in the multifunction peripheral 120 will be described with reference to FIGS. 5A and 5B. The CPU 302 of the multifunction peripheral 120 loads a program stored in a storage unit such as the HDD 305 into a memory such as the RAM 303, and executes the loaded program, thereby implementing a flow in each of FIGS. 5A and 5B.

When there is no user logging into the multifunction peripheral 120, the display unit 321 displays a login screen illustrated in FIG. 6A. In step S500, the multifunction peripheral 120 accepts login information from a user. The user inputs a user name (the identification information of the user) and a password into the multifunction peripheral 120 via the login screen. The multifunction peripheral 120 executes user authentication by using the input user name and password. Alternatively, the multifunction peripheral 120 may request an external authentication server to perform authentication. When the user is authenticated, the multifunction peripheral 120 permits the login of the user, and displays an operation screen associated with the authenticated user (the login successful). When the user is not authenticated, the multifunction peripheral 120 does not permit the login of the user.

In step S501, the CPU 302 determines whether the login is successful, i.e., whether the login of the user is permitted. When the login is permitted (YES in step S501), the processing proceeds to step S502. When the login is not permitted (NO in step S501), step S500 and step S501 are repeated while the login screen remains displayed.

In step S502, the CPU 302 transmits an acquisition request to acquire update information to the server 110. The acquisition request transmitted in step S502 includes the identification information of the logged-in user. In the present exemplary embodiment, the CPU 302 issues a request to acquire update information of setting values corresponding to the identification information of the logged-in user, among the setting values managed by the master data 410 of the server 110. The update information of the setting values corresponding to the identification information of the logged-in user includes, for example, a setting value necessary for causing the display unit 321 to display a setting screen customized to the logged-in user. Further, the update information of the setting values corresponding to the identification information of the logged-in user includes, for example, a setting value for implementing a function customized to the logged-in user in the multifunction peripheral 120.

In step S503, the CPU 302 starts receiving the update information of the setting values from the server 110 via the network I/F 307, as a response to the acquisition request transmitted in step S502. As described above, in the present exemplary embodiment, the update information of the setting values corresponding to the identification information of the logged-in user is received. The update information acquired in response to the acquisition request also includes update information of setting values common to all users regardless of the user. In the present exemplary embodiment, the update contents of the master data 410 of the server 110 after the time when the synchronization processing is last performed with the server 110 by the multifunction peripheral 120 are received as the update information. In this way, when executing the login processing of the user in response to the login request, the network I/F 307 receives the update information, which indicates the update contents of the setting information stored in the server 110, from the server 110.

In step S504, upon starting the receipt of the setting values, the CPU 302 starts processing for displaying a post-login screen, by controlling the operation unit I/F 301. The processing for displaying the screen can start before completion of the receipt of the update information started in step S503. The operation unit I/F 301 performs the processing for display, by using the update information received from the server 110. Here, among the update information received from the server 110, update information about a predetermined setting item is not reflected in the post-login screen. Details of the processing for display will be described with reference to FIG. 5B.

In step S505, the CPU 302 determines whether the receipt of the update information from the server 110 is completed. When the receipt of the update information is not completed (NO in step S505), the CPU 302 repeats step S504 and step S505. On the other hand, when the receipt of the update information is completed (YES in step S505), the processing proceeds to step S506.

In step S506, the CPU 302 determines whether a setting item not reflected in the setting values of the multifunction peripheral 120 after the login is present in the update information received from the server 110. When the setting item not reflected is not present (NO in step S506), the processing in FIG. 5A ends. On the other hand, when the setting item not reflected is present (YES in step S506), the processing proceeds to step S507. In step S507, the CPU 302 causes the display unit 321 to display a predetermined message. The predetermined message is, for example, a message for notifying the user that at least part of the update information received from the server 110 upon the login is not reflected or is possibly not reflected in the multifunction peripheral 120. Further, the predetermined message is, for example, a message for prompting the user to log in again or to update (reload) the setting information, in order to reflect the update information in the multifunction peripheral 120.

Figure 6C:
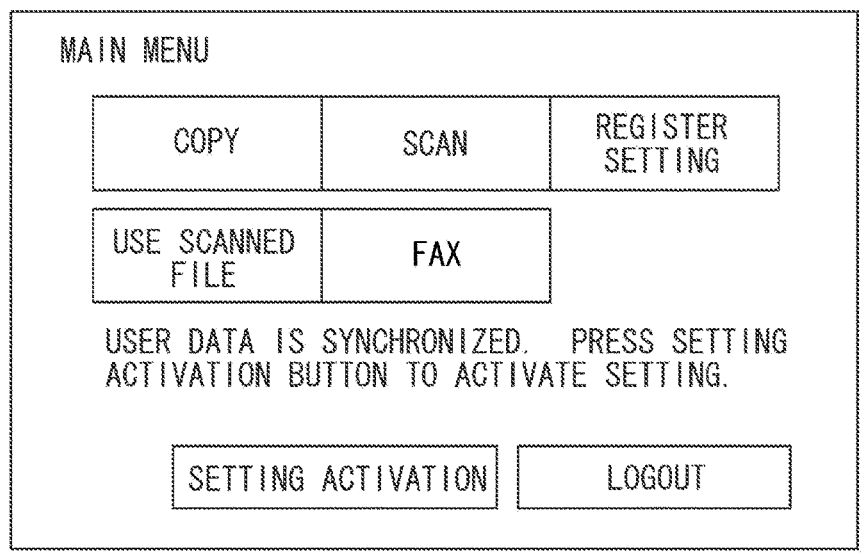
FIG. 6C is a diagram illustrating an example of a post-login screen.

For example, a message illustrated in FIG. 6B can be displayed as the predetermined message in a menu screen. The message says, "User data is synchronized. Log in again to activate setting." in FIG. 6B. Alternatively, a message illustrated in FIG. 6C can be displayed in the menu screen. The message says, "User data is synchronized. Press setting activation button to activate setting." in FIG. 6C. This setting activation button is a reload button to update (reload)

the settings of the multifunction peripheral 120. The CPU 302 performs control for causing the display unit 321 to display the reload button together with the message in step S507. The display mode of the message is not limited to the example in each of FIGS. 6B and 6C. The predetermined message may be displayed in a popup.

The message illustrated in each of FIGS. 6B and 6C is just an example, and other message may be displayed. For example, a message saying "There is a possibility that setting synchronization may not be completed.", or a message saying "Setting synchronization is not completed." may be displayed.

Displaying such a message allows the user to recognize that a menu screen is displayed in a state where the update information received from the server 110 is not reflected. Upon displaying the message, the processing illustrated in FIG. 5A ends.

Next, details of the processing for displaying in step S504 will be described with reference to FIG. 5B. Processing illustrated in FIG. 5B is executed for each setting item of the update information received from the server 110, and repeated until the processing is completed for all the setting items received from the server 110.

In step S510, upon receipt of a setting value from the server 110, the CPU 302 determines whether a setting item that is a processing target is a predetermined setting item. In the present exemplary embodiment, the update information received from the server 110 may include update information about a first setting item and update information about a second setting item. In the present exemplary embodiment, the first setting item is a setting item other than a predetermined setting item to be described below. In the present exemplary embodiment, the second setting item is the predetermined setting item. The predetermined setting item is, for example, a setting item not to be reflected in an operation screen that is displayed in the display unit 321 immediately after the login processing. Examples of the setting item not to be reflected in the operation screen immediately after the login processing may include a screen-color setting that is a setting for background color and icon color of the operation screen. The examples may further include a setting for a display size (or a display magnification) of text and icons of the operation screen. The predetermined setting item is not limited to the display settings. Examples of the predetermined setting item may include default settings (initial settings) for copy (such as a setting indicating two-sided printing or one-sided printing, and a collective print setting indicating how many pages of print data is to be printed on one sheet). The examples of the predetermined setting item may also include audio settings.

These predetermined setting items are not reflected immediately after a login, even if setting values for these setting items can be received from the server 110. This can reduce a processing load on the display control module 413, and allows the display unit 321 to display a post-login operation screen quickly.

The user may feel uncomfortable with a change in the setting contents of a certain setting item after login. Such a setting item may not be reflected, regardless of the processing load of the reflection processing.

For example, the multifunction peripheral 120 may receive update information indicating occurrence of a change in language setting from English to Japanese in the server 110. This example will be described. In this example, the multifunction peripheral 120 displays an operation screen in English, before reflecting the update information received from the server 110. Immediately after a login, the multifunction peripheral 120 displays an operation screen in English. After a lapse of a few seconds, the update information received from the server 110 is reflected. Upon this reflection, the display language changes from English to Japanese. The user may feel uncomfortable if the display language changes in a few seconds upon the login. Therefore, the multifunction peripheral 120 can be restrained from reflecting the update contents, for the setting value of the language setting. In other words, according to this example, the multifunction peripheral 120 can keep displaying a post-login operation screen in English, even after receiving update information.

How to make the determination in step S510 is not limited in particular. For example, a storage unit such as the HDD 305 may hold a table illustrated in FIG. 7A, and the CPU 302 can determine whether the setting item is the predetermined setting item by referring to this table. In the table illustrated in FIG. 7A, identification information (ID) of setting items, names of the respective setting items, and information indicating whether to reflect a setting at a login are associated with each other and managed. The determination in step S510 may start before completion of the receipt of the update information started in step S503.

When the setting item that is the processing target is not the predetermined setting item (NO in step S510), the processing proceeds to step S511. In step S511, the CPU 302 performs the reflection processing, i.e., causes the multifunction peripheral 120 to reflect the received update information, and then ends the processing for this setting item. In this case, the display unit 321 displays a menu screen in a state where the update information received from the server 110 is reflected for this setting item. For example, the update information transmitted from the server 110 to the multifunction peripheral 120 is reflected in the multifunction peripheral 120, for a setting item such as address book information customized to the logged-in user.

On the other hand, when the setting item that is the processing target is the predetermined setting item (YES in step S510), the processing proceeds to step S512. In step S512, the CPU 302 displays a menu screen, in which the received update information is not reflected for this setting item, on the display unit 321. When not reflecting the received update information, the CPU 302 reads out setting information stored (cached) in a storage unit such as the HDD 305, for this setting item. The CPU 302 then displays a menu screen, based on the read-out setting information. This setting information stored in the storage unit is information stored in the multifunction peripheral 120 by processing such as the synchronization processing performed with the server 110 before the start of the login processing.

In this way, the CPU 302 performs such control that the update information about the first setting item among the update information received from the server 110 is reflected in the multifunction peripheral 120 upon the execution of the login processing. In addition, the CPU 302 performs such control that the update information about the second setting item among the update information received from the server 110 is restrained from reflection in the multifunction peripheral 120 upon the execution of the login processing.

In step S513, the CPU 302 stores (caches) the update information, which is received from the server 110 and corresponds to the setting item not to be reflected in a post-login menu screen, to the storage unit such as the HDD 305 of the multifunction peripheral 120. In the example illustrated in FIG. 4, the received update information corresponding to the predetermined item is distinguished as update information not to be reflected in the multifunction peripheral 120, and stored into the setting value DB 420. When the user logs in again, the stored data is reflected in the multifunction peripheral 120. Alternatively, the stored data may be reflected in the multifunction peripheral 120, when the user presses the reload button provided in the menu screen. The CPU 302 thus performs control for storing the update information, which is not to be reflected in the settings of the multifunction peripheral 120 among the update information received from the server 110, into the storage unit.

Further, in step S514, the CPU 302 stores information indicating no reflection of the received data into a storage unit such as the RAM 303 or the HDD 305. Specifically, the CPU 302 stores information indicating that the received update information is not reflected in the settings of the multifunction peripheral 120, for the setting item that is the processing target. For example, the information can be stored using flag processing. The CPU 302 can use the information stored in step S514, for execution of the determination in step S506. The CPU 302 can determine that the setting item not reflected is present (YES in step S506), when the stored information is information indicating that some of the setting items of the received update information are not reflected in the settings of the multifunction peripheral 120. The CPU 302 can also perform the determination in step S506, by storing information indicating that the received update information is reflected in the settings of the multifunction peripheral 120, and then confirming that reflection in the multifunction peripheral 120 for all the setting items received from the server 110 is completed.

As described with reference to FIGS. 5A and 5B, the CPU 302 causes the display unit 321 to display the predetermined message, when the update information about the second setting item is included in the update information received from the server 110. The predetermined message is, for example, a message indicating there is a possibility that the settings of the multifunction peripheral 120 may not be synchronized with the setting information stored in the server 110. Alternatively, the predetermined message may be a message for promoting execution of further processing (e.g., re-login processing or reload processing). This processing reflects the update information, which is restrained from reflection in the settings of the multifunction peripheral 120, in the settings of the multifunction peripheral 120.

It may take a long time to reflect the received data in the multifunction peripheral 120. In the present exemplary embodiment, such data is not reflected in the multifunction peripheral 120, until a re-login is performed after a login, or an instruction for updating a setting is provided. Therefore, the user can use the multifunction peripheral 120 without waiting, upon performing login operation.

Assume that, after the receipt of the update information, the user logs out of the multifunction peripheral 120 once, and then logs in again. In this case, in a manner similar to that described above, an acquisition request to acquire update information is transmitted to the server 110, and the update information acquired from the server 110 is set in the multifunction peripheral 120 according to the setting item. Further, the setting information cached in the storage unit of the multifunction peripheral 120 is read out and then set in the multifunction peripheral 120. Here, the setting information cached in the storage unit includes update information, which is acquired from the server 110 at the last login and not reflected in the settings of the multifunction peripheral 120. This update information not reflected is reflected in the multifunction peripheral 120, when the user logs into the multifunction peripheral 120 again.

Further, when the user provides an instruction for execution of the reload processing after the receipt of the update information, the setting information cached in the storage unit of the multifunction peripheral 120 is read out and then set in the multifunction peripheral 120. The setting information cached in the storage unit includes update information, which is acquired from the server 110 in a login and not reflected in the settings of the multifunction peripheral 120. This update information not reflected is reflected in the multifunction peripheral 120, when the user provides an instruction for execution of reload.

Furthermore, when there is a possibility that the received data may not be reflected in the multifunction peripheral 120, the message appears in a post-login menu screen. The user can be therefore notified that the reflection of the received data is not completed.

According to the above-described configuration, when there is a possibility that setting information received from a server may not be reflected in an information processing apparatus, a user can recognize such a possibility. Further, when the setting information received from the server is not reflected in the information processing apparatus, the user can be prompted to reflect the setting information received from the server in the settings of the information processing apparatus, by logging in again, or reloading setting values.

The first exemplary embodiment is described taking the example in which the predetermined item among the data received from the server 110 in response to the login is not reflected in the multifunction peripheral 120 at the execution of the login processing. However, the reflection processing for the update information may be performed for the predetermined setting item, when the multifunction peripheral 120 can reflect the update information within a predetermined time from start of a login. An example is described below in which the reflection processing for update information may be performed for the predetermined setting item, when the multifunction peripheral 120 can reflect the update information within a predetermined time from start of a login.

Figure 8B:
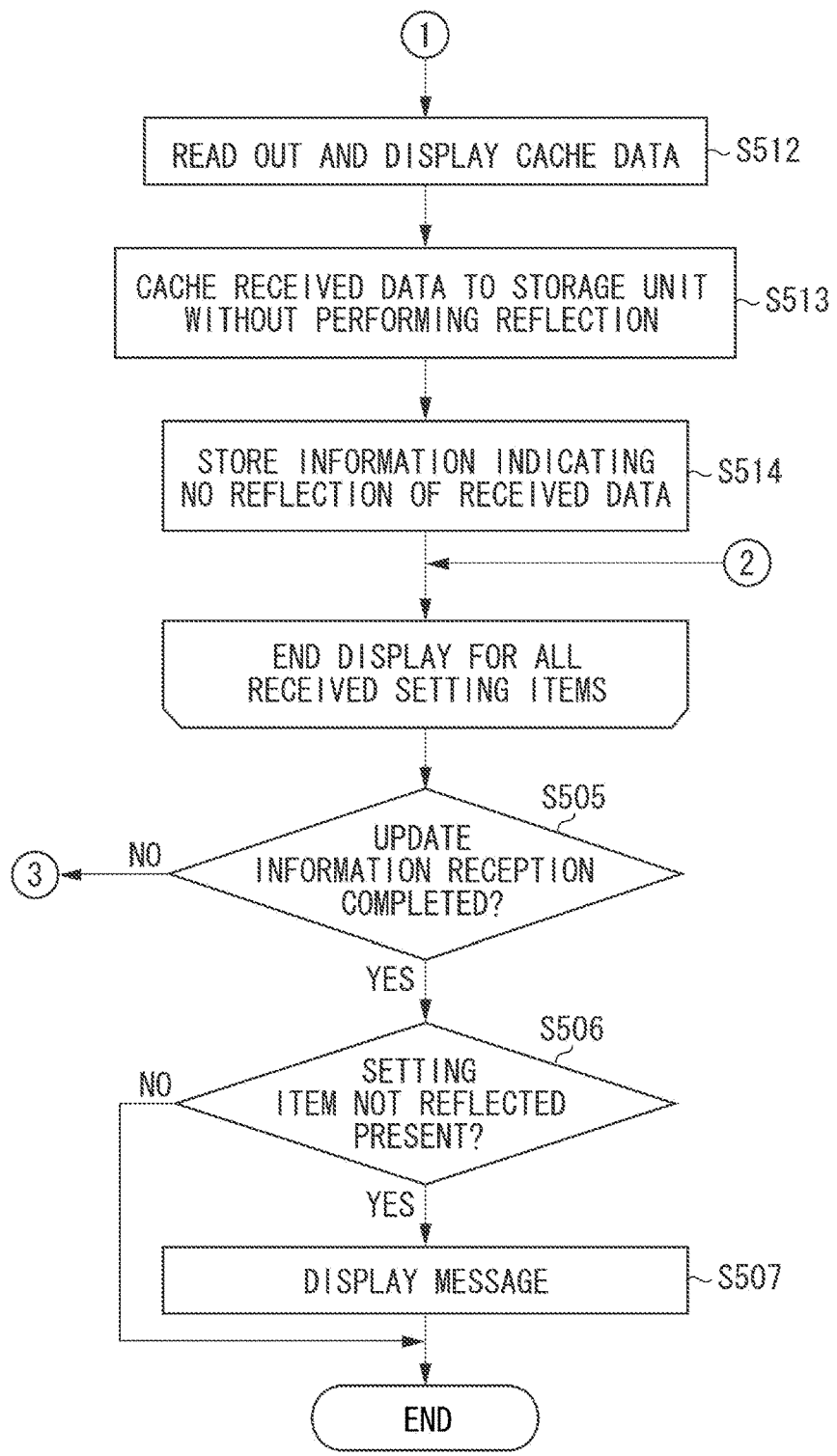
FIG. 8 includes FIGS. 8A and 8B which are diagrams illustrating operation of a multifunction peripheral, according to a second exemplary embodiment.

A configuration of a system according to a second exemplary embodiment is similar to that described in the first exemplary embodiment, and therefore will not be described. Processing to be executed by the multifunction peripheral 120 in the present exemplary embodiment will be described with reference to FIG. 8, which includes FIGS. 8A and 8B. The CPU 302 can implement a flow in FIGS. 8A and 8B, by loading a program stored in a storage unit such as the HDD 305 of the multifunction peripheral 120 into a memory such as the RAM 303, and executing the loaded program. The same steps as those described with reference to FIG. 5 in the first exemplary embodiment are provided with the same step numbers as those in FIG. 5, and therefore will not be described.

In step S801, in response to the login being successful, a timer unit (not illustrated) starts timing by the control of the CPU 302. In the example illustrated in FIGS. 8A and 8B, a synchronization request is issued in step S502 after the timing beings. However, the timing may begin after the synchronization request is issued. When to start the timing is not limited in particular.

After the receipt of the update information begins in step S503, the CPU 302 starts processing for displaying for each setting item. This processing for displaying is repeated until the processing is completed for all the setting items received from the server 110.

In the present exemplary embodiment, the setting items of the update information received from the server 110 include a setting item not to be reflected, a setting item to be reflected if a predetermined condition is satisfied, and a setting item to be reflected, in the settings of the multifunction peripheral 120 after a login. The setting item not to be reflected is a setting item not to be reflected in the settings of the multifunction peripheral 120, regardless of whether reflection can be performed within a predetermined time after start of the login processing. The setting item to be reflected if the predetermined condition is satisfied is a setting item for which the reflection processing is performed only when reflection can be performed within a predetermined time after start of the login processing. The setting item not to be reflected and the setting item to be reflected if the predetermined condition is satisfied may be collectively referred to as a "setting item to be restrained from reflection".

First, in step S802, the CPU 302 determines whether the setting item that is the processing target is the setting item not to be reflected in the multifunction peripheral 120. When the setting item that is the processing target is the setting item not to be reflected in the multifunction peripheral 120 (YES in step S802), the processing from step S512 to step S514 described in the first exemplary embodiment is performed.

When the setting item that is the processing target is not the setting item not to be reflected in the multifunction peripheral 120 (NO in step S802), the processing proceeds to step S803 to perform determination processing.

In step S803, the CPU 302 determines whether the setting item that is the processing target is the setting item to be reflected in the multifunction peripheral 120 if the predetermined condition is satisfied. If the setting item that is the processing target is not the setting item to be reflected in the multifunction peripheral 120 if the predetermined condition is satisfied (NO in step S803), the processing proceeds to step S805. In step S805, the CPU 302 performs the reflection processing, which continues until the reflection processing of the update information is completed.

On the other hand, if the setting item that is the processing target is the setting item to be reflected in the multifunction peripheral 120 if the predetermined condition is satisfied (YES in step S803), the processing proceeds to step S804. In step S804, based on a result of the timing of the timer unit, the CPU 302 determines whether the reflection of the update information in the multifunction peripheral 120 is to be completed within a predetermined time following the start of the timing. The predetermined time can be a time different for each setting item, or can be a time common to all the setting items.

Here, an example of information used in the determination in step S804 will be described with reference to a table illustrated in FIG. 7B. The table illustrated in FIG. 7B includes an estimated time for performing the reflection processing for each setting item. For example, the example in FIG. 7B indicates that it takes two seconds to reflect the update information received from the server 110 for the language setting. The multifunction peripheral 120 can determine the estimated time, by using a communication state between the server 110 and the multifunction peripheral 120, or by using the amount of data received from the server 110. Alternatively, the server 110 may calculate an estimated time, and notify the multifunction peripheral 120 of the calculated estimated time.

In addition, the example illustrated in FIG. 7B indicates that, in principle, the reflection processing is performed upon the login processing, for the update information received from the server 110 for the copy settings. However, the update information received from the server 110 for the copy settings is reflected only when the reflection can be performed within the predetermined time, if the received update information includes predetermined associated data. In the example illustrated in FIG. 7B, the predetermined associated data is "common_settings.default_mode=COPY". In this example, the estimated time for the reflection processing is one second if the predetermined associated data is present. The CPU 302 can determine whether the reflection processing for the setting item that is the processing target can be performed within the predetermined time, by making a comparison between the estimated time in FIG. 7B and the predetermined time.

When the reflection of the update information is not to be completed within the predetermined time (NO in step S804), the CPU 302 executes the processing from step S512 to step S514. On the other hand, when the reflection of the update information is to be completed within the predetermined time (YES in step S804), the processing proceeds to in step S806. In step S806, the CPU 302 executes the reflection processing.

The processing thereafter is similar to the processing described with reference to FIG. 5 in the first exemplary embodiment, and therefore will not be described.

As described above, the control is performed in such a manner that, if the time to be taken for reflecting the update information of the second setting item among the update information received from the server 110 in the settings of the multifunction peripheral 120 is shorter than the predetermined time, this update information is reflected in the settings of the multifunction peripheral 120 upon the execution of the login processing. In addition, if the time to be taken for reflecting the update information of the second setting item among the update information received from the server 110 in the settings of the multifunction peripheral 120 is longer than the predetermined time, the following processing is performed. In this processing, the control is performed to avoid reflecting the update information about the second setting item in the settings of the multifunction peripheral 120 upon the execution of the login processing.

According to the present exemplary embodiment, the reflection processing for a setting item is performed when the reflection can be performed within the predetermined time, even if this setting item is the setting item to be restrained from reflection in the multifunction peripheral 120 following the login. Therefore, it is possible to perform the synchronization processing between the server 110 and the multifunction peripheral 120, without keeping the user waiting, or making the user feel uncomfortable with reflection performed after a lapse of a predetermined time.

(Other Exemplary Embodiments)

Each of the first and second exemplary embodiments described above is only an example. An exemplary embodiment may be implemented by a combination using the processing and operation of each of the exemplary embodiments. The present invention is not limited to the configuration of each of the exemplary embodiments.

In addition, the client according to each of the exemplary embodiments is not necessarily a configuration limited to the multifunction peripheral. The client is applicable to, for example, an information terminal, which is a device that manages setting values and changes the setting values according to the information of the device.

Moreover, the first and second exemplary embodiments are each described taking the example in which, when the update information does not include the setting item to be restrained from reflection (i.e. the setting item to be reflected if the predetermined condition is satisfied) and the setting item not to be reflected, the reflection processing is performed until the reflection of the update information is completed. However, the first and second exemplary embodiments are not limited to this example. Even when the update information does not include the setting item to be restrained from reflection and the setting item not to be reflected, the reflection processing may be stopped if the reflection of the update information is not completed after a lapse of a predetermined time following the start of the timing. In this case, the processing proceeds to step S507, in which the display unit 321 displays a message saying that part or all of the update information is not reflected in the multifunction peripheral 120.

Furthermore, in a case where the message is displayed once in step S507 and the processing in FIG. 5A is completed, information indicating that the message is displayed may be stored so that the execution of the processing in step S507 may be skipped from the next time. In other words, the execution of the processing in step S507 may be omitted, when the setting item not reflected is determined to be present in step S506 in the processing illustrated in FIG. 5A, from the next time. This is because, once the message is displayed, the user can recognize a possibility of no reflection of the received setting information after the login, without viewing the message, from the next time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072591, filed Mar. 31, 2016, which is hereby incorporated by reference herein in its entirety.

What is claimed is:

1. A communication apparatus capable of communicating with a server, comprising:
a display device configured to display information; and
at least one controller configured to function as:
a unit configured to cause the display device to display an identification screen for acquiring user identification information;
a unit configured to, upon acquiring the user identification information, transmit a request based on the user identification information to the server;
a unit configured to, upon acquiring the user identification information, cause a screen transition from the identification screen to a next screen, wherein a predetermined message is displayed on the next screen later in response to receiving setting information from the server, wherein the setting information is information that corresponds to the user identification information and relates to a display method of the next screen; and
a unit that causes the display device to display the next screen whose display method has been changed on a basis of the setting information upon acquiring the user identification information after further display of the identification screen,
wherein the predetermined message is a message that prompts a user to perform an operation including a step of instructing for further display of the identification screen.

2. The communication apparatus according to claim 1, wherein the predetermined message is not displayed on the next screen even if another setting information that is different from the setting information, which is information that corresponds to the user identification information and relates to the display method of the next screen, is received from the server.

3. The communication apparatus according to claim 1, wherein the controller performs login processing upon acquiring the user identification information.

4. The communication apparatus according to claim 1, wherein the setting information is information that relates to background color of the next screen.

5. The communication apparatus according to claim 1, wherein the setting information is information that relates to icon color of the next screen.

6. The communication apparatus according to claim 1, wherein the setting information is information that relates to text size of the next screen.

7. The communication apparatus according to claim 1, wherein the setting information is information that relates to icon size of the next screen.

8. The communication apparatus according to claim 1, wherein the setting information is information that relates to display language of the next screen.

9. The communication apparatus according to claim 1, wherein the next screen is a menu screen that includes a plurality of icons.

10. A control method for controlling a communication apparatus that includes a display device configured to display information and is capable of communicating with a server, comprising:
causing the display device to display an identification screen for acquiring user identification information;
upon acquiring the user identification information, transmitting a request based on the user identification information to the server;

upon acquiring the user identification information, causing a screen transition from the identification screen to a next screen, wherein a predetermined message is displayed on the next screen later in response to receiving setting information from the server, wherein the setting information is information that corresponds to the user identification information and relates to a display method of the next screen; and causing the display device to display the next screen whose display method has been changed on a basis of the setting information upon acquiring the user identification information after further display of the identification screen, wherein the predetermined message is a message that prompts a user to perform an operation including a step of instructing for further display of the identification screen.

11. A non-transitory computer-readable storage medium storing a program for causing a computer to implement a control method for controlling a communication apparatus that includes a display device configured to display information and is capable of communicating with a server, the control method comprising:

causing the display device to display an identification screen for acquiring user identification information;

upon acquiring the user identification information, transmitting a request based on the user identification information to the server;

upon acquiring the user identification information, causing a screen transition from the identification screen to a next screen, wherein a predetermined message is displayed on the next screen later in response to receiving setting information from the server, wherein the setting information is information that corresponds to the user identification information and relates to a display method of the next screen; and causing the display device to display the next screen whose display method has been changed on a basis of the setting information upon acquiring the user identification information after further display of the identification screen, wherein the predetermined message is a message that prompts a user to perform an operation including a step of instructing for further display of the identification screen.

\* \* \* \* \*